US006785013B1

(12) United States Patent
Ota et al.

(10) Patent No.: US 6,785,013 B1
(45) Date of Patent: Aug. 31, 2004

(54) SYSTEM FOR CAPTURING IMAGES FROM A PERIPHERAL UNIT AND TRANSFERRING THE CAPTURED IMAGES TO AN IMAGE MANAGEMENT SERVER

(75) Inventors: Junichi Ota, Palo Alto, CA (US); Ji-Hwan Gary Liu, Cupertino, CA (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/311,738

(22) Filed: May 14, 1999

(51) Int. Cl.[7] .............................. G06F 3/12; G06K 15/02
(52) U.S. Cl. ....................... 358/1.15; 358/296; 358/404; 358/444; 399/1; 399/87; 399/403; 399/408
(58) Field of Search ............................... 358/1.15, 1.16, 358/1.17, 434, 448, 1.12, 401, 404, 1.14; 382/162, 166, 232; 396/429, 422; 708/625, 200, 653, 630; 712/38; 348/86

(56) References Cited

U.S. PATENT DOCUMENTS

| 4,647,982 A | * | 3/1987 | Aoi .............................. 358/296 |
| 4,761,643 A | * | 8/1988 | Fujiwara ....................... 345/539 |
| 4,825,296 A | * | 4/1989 | Wagensonner et al. ...... 358/443 |
| 5,220,648 A | * | 6/1993 | Sato ................................ 707/3 |
| 5,412,488 A | * | 5/1995 | Ogata .......................... 358/437 |
| 5,463,476 A | * | 10/1995 | Oya ........................ 358/426.02 |
| 5,535,017 A | * | 7/1996 | Hideaki ....................... 358/444 |

(List continued on next page.)

FOREIGN PATENT DOCUMENTS

| DE | 19751571 A1 | * | 11/1997 | ............. H04N/1/00 |
| DE | 19751571 A1 | * | 8/1998 | ............. B41B/1/00 |

(List continued on next page.)

Primary Examiner—Twyler Lamb
Assistant Examiner—David L. Jones
(74) Attorney, Agent, or Firm—Oblon, Spivak, McClelland, Maier & Neustadt, P.C.

(57) ABSTRACT

An image data storing system, and more particularly a video capture controller to capture raw video image data from a peripheral unit and to provide compressed video image data to a document image management server. The video capture controller includes a control processor, a first memory, and a second memory. The first memory stores raw video image data from the peripheral unit under control of the control processor. The raw video image data stored in the first memory is then converted into compressed video image data, and is then stored in the second memory, again under control of the control processor. Then, the compressed video image data from the second memory is transferred to the image management server. Moreover, the control processor stops any executing operation of converting the raw video image data stored in the first memory into compressed video image data and stops any executing of the transfer of the compressed video image data from the second memory to the image management server while the first memory is storing the raw video image data. A third memory may further be provided between the peripheral unit and the first memory. This third memory can be a page memory which performs a direct memory access of the raw video image data output from the peripheral unit into the page memory. The raw video image data may be initially output to the page memory when the page memory is set to a maximum page size. Then, the page size setting of the third memory can be changed based on subsequently received page size data. These operations ensure that the raw video image data can be quickly stored in a first memory, which may prevent having to reduce a speed of generating the raw video image data in the peripheral unit. Further, if the raw video image data is output prior to outputting accompanying commands indicating a page size of the raw video image data, no raw video image data will be lost.

39 Claims, 10 Drawing Sheets

U.S. PATENT DOCUMENTS

| | | | | |
|---|---|---|---|---|
| 5,606,365 | A | * | 2/1997 | Maurinus et al. ......... 348/222.1 |
| 5,734,182 | A | * | 3/1998 | Nakamura et al. ............. 257/96 |
| 5,734,482 | A | * | 3/1998 | Miyamoto et al. ........... 358/444 |
| 5,768,483 | A | * | 6/1998 | Maniwa et al. ............ 358/1.15 |
| 5,774,758 | A | * | 6/1998 | Takahashi et al. ............. 399/1 |
| 5,787,487 | A | * | 7/1998 | Hashimoto et al. ......... 711/165 |
| 5,802,603 | A | * | 9/1998 | Bains et al. ................. 711/202 |
| 5,894,545 | A | * | 4/1999 | Fukuta ...................... 358/1.16 |
| 5,970,222 | A | * | 10/1999 | Gusmano et al. .......... 358/1.16 |
| 5,970,223 | A | * | 10/1999 | Debes et al. ............... 358/1.16 |
| 5,983,051 | A | * | 11/1999 | Mishima et al. .............. 399/83 |
| 6,002,995 | A | * | 12/1999 | Suzuki et al. ............... 702/188 |
| 6,005,680 | A | * | 12/1999 | Luther et al. ................ 358/2.1 |
| 6,104,886 | A | * | 8/2000 | Suzuki et al. ............... 396/429 |
| 6,160,968 | A | * | 12/2000 | Noda ............................ 399/8 |
| 6,192,202 | B1 | * | 2/2001 | Doi ................................ 399/8 |
| 6,239,880 | B1 | * | 5/2001 | Barrett et al. ............. 358/1.16 |
| 6,246,797 | B1 | * | 6/2001 | Castor et al. ............... 382/232 |
| 6,263,020 | B1 | * | 7/2001 | Gardos et al. ......... 375/240.03 |
| 6,331,900 | B1 | * | 12/2001 | Kuno .......................... 358/1.9 |
| 6,529,234 | B2 | * | 3/2003 | Urisaka et al. ........ 348/211.99 |

FOREIGN PATENT DOCUMENTS

| | | | | |
|---|---|---|---|---|
| DE | 197 51 571 | | 8/1998 | |
| EP | 0 880 270 | | 11/1998 | |
| EP | 0 880 270 A2 | * | 11/1998 | ............ H04N/1/00 |
| EP | 0952736 | * | 10/1999 | .......... H04N/5/926 |
| EP | 0 880 270 A3 | * | 4/2000 | ............ H04N/1/00 |
| JP | 05-207926 | * | 8/1993 | ............ A47J/27/00 |
| JP | 06-046185 | | 2/1994 | |
| JP | 07-273927 | | 10/1995 | |
| JP | 9-224135 | | 8/1997 | |
| JP | 09-224135 | * | 8/1997 | ............ H04N/1/21 |

\* cited by examiner

SYSTEM FOR CAPTURING IMAGES FROM A PERIPHERAL UNIT AND TRANSFERRING THE CAPTURED IMAGES TO AN IMAGE MANAGEMENT SERVER

BACKGROUND OF THE INVENTION

1. Field of the Invention

The present invention is directed to a video image capture controller which can capture video images from a peripheral unit, such as a multi-function digital copier, and which can then transfer captured video image data to a document image management server.

2. Discussion of the Background

It may be desirable under certain circumstances to capture video image data from a peripheral unit, and particular a peripheral unit which includes a scanner such as a multi-function digital copier, and transfer the captured video image data to a document image management server. In this situation, a document image management server is a central server which can store a plurality of video image data and which can be accessed through a network.

In this type of system, a plurality of users connected to the network would have access to the video image data captured from the peripheral unit through the network to which the document image management server was also connected.

However, in such a system the captured raw video image data from the peripheral unit contains a great amount of information which would thus correspond to very large data files. In order for such a system to be currently feasible, the raw video image data captured from the peripheral unit must be compressed prior to being stored in the document image management server. This requirement of compressing the captured raw video image data results in certain problems.

More particularly, when a high speed multi-function digital copier as a peripheral unit scans a document for which video image data is to be captured, such a scanning can be performed at a very high speed. However, an operation of compressing such scanned raw video image data is significantly slower than the operation of scanning the document to generate the raw video image data. Therefore, the operation of compressing the raw video image data is a bottleneck in the overall system performance.

As a result, when compressed video image data of a document is to be provided to a document image management server, the scanning speed of the document in the multi-function digital copier peripheral unit is reduced to correspond with the speed that the raw video image data can be compressed.

This result is particularly problematic when the peripheral unit is a multi-function high speed digital copier. More particularly, and as noted above, if a peripheral unit as a multi-function high speed digital copier is scanning a document to generate scanned document raw video image data, the scanning operation will have to be slowed down to match a speed at which the scanned document raw video image data can be compressed. Slowing down such a scanning speed essentially defeats the purpose of utilizing a multi-function high speed digital copier in the first place. Needless to say, slowing down the scanning speed also reduces productivity and increases delays in utilizing the multi-function high speed digital copier.

Another problem which may arise in such a system is that when the scanned raw video image data is transferred, the scanned raw video image data is also transferred with accompanying control codes indicating data of a page size, page resolution, etc. of the raw video image data. In certain circumstances there may be a delay in transferring the control codes relative to transferring the scanned raw video image data. In this instance there may be a loss of any scanned raw video image data which proceeds its accompanying control codes.

SUMMARY OF THE INVENTION

The present invention has been made in view of the above-noted and other problems. It is one particular object of the present invention to overcome the above-noted and other problems.

It is more particularly an object of the present invention to provide a novel image management system, and more particularly a novel video image capture controller utilized therein, which can operate at a high scanning speed of a peripheral unit, and particularly when the peripheral unit is a high speed multi-function digital copier.

The present invention thereby provides a novel image data storing system, and more particularly a novel video capture controller therein, which can allow for operation in a filing mode in which video image data generated from a peripheral unit, such as a multi-function digital copier, can be provided to a document image management server without reducing a speed of generating the raw video document image data from the peripheral unit.

The present invention achieves these and other objects by providing a novel image data storage system, and more particulary a novel video image capture controller therein, in which raw video image data from a peripheral unit can be captured and compressed image data based on the captured raw video image data can be transferred to an image management server. The novel video image capture controller of the present invention includes a control processor, a first memory, and a second memory. The first memory stores raw video image data from the peripheral unit under control of the control processor. The raw video image data stored in the first memory is then converted into compressed video image data, and is then stored in the second memory, again under control of the control processor. Then, the compressed video image data stored in the second memory is transferred to the image management server. Moreover, in the present invention the control processor stops any executing operation of converting the raw video image data stored in the first memory into compressed video image data and stops any executing of the transfer of the compressed video image data from the second memory to the image management server while the first memory is storing the raw video image data. Such an operation in the present invention ensures that the scanned raw video image data can be quickly stored in the first memory so that the scanning operation can proceed at a high speed. Only after all of the raw video image data is stored in the first memory does the control processor then operate to compress such stored raw video image data and then subsequently transfer the compressed video image data to the image management server.

Another object of the present invention is to ensure that when raw video image data is provided from a peripheral unit, such raw video image data is not lost, and particularly if there is a delay in providing control codes which accompany the raw video image data. This situation may become particularly problematic when the raw video image data and control codes are provided on separate communication lines. Addressing this problem also ensures being able to maintain a high speed scanning operation in the peripheral unit.

Moreover, even with the above-noted structure and operation of initially storing raw video image data in the first memory, a problem may still arise if the raw video image data cannot be stored in the first memory at the same high speed as the scanning can be performed in the peripheral unit.

To achieve further objects of the present invention, a DMA engine and third memory can be added between the peripheral unit and the first memory. This third memory can take the form of a page memory which, upon initially receiving raw video image data from the peripheral unit, sets page size information in the page memory to a maximum of page size data which can be provided from the peripheral unit, and which then modifies the set page size data after receiving appropriate control codes. With such an operation in the present invention, if the control codes are delayed with respect to the raw video image data provided from the peripheral unit, the raw video image data is not lost but will be stored until the control codes are provided.

A further benefit of the present invention of utilizing this third memory is that it provides a buffer if the operation of storing the raw video image data into the first memory is slightly slower than the operation of scanning the document to generate the raw video image data.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
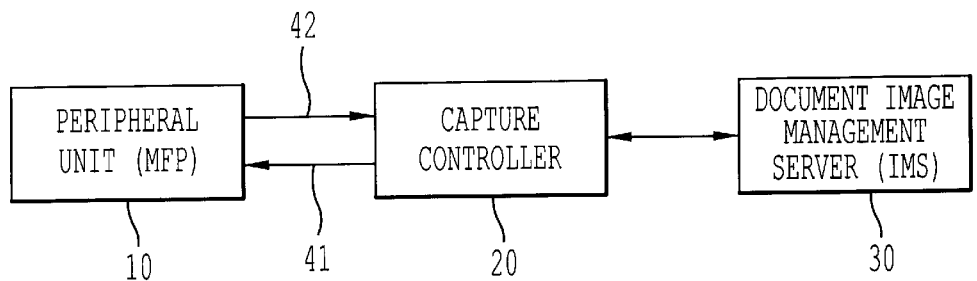
FIG. 1 shows an overall system view of a video image data storing system of the present invention.

Referring now to the drawings, wherein like reference numerals designate identical or corresponding parts throughout the several views, and more particularly to FIG. 1 thereof, an overall video image capture and storing system of the present invention is shown.

As shown in FIG. 1, a video image capture and storing system of the present invention includes a multi-function peripheral unit (MFP) 10, which may typically take the form of a multi-function digital copier. Throughout the following disclosure the peripheral unit 10 may be described as a multi-function digital copier, although it is again noted that the peripheral unit 10 can take the form of other similar devices. A capture controller 20 is connected to the peripheral unit 10 through two communication lines. Communication line 41 is a serial communication line which transfers control codes from the peripheral unit 10 to the capture controller 20. The communication line 41 may typically take the form of an RS232 serial communication line. The communication line 42 is a second communication line which provides raw video image data from the peripheral unit 10 to the capture controller 20. This communication line 42 may typically take the form of parallel data lines with control and clock signals.

As also shown in FIG. 1, the capture controller 20 is connected to a document image management server (IMS) 30. The document image management server 30 is a storage server for storing video image data, typically as bit map data. The document image management server 30 will typically be connected to a network (not shown) to which several users are also connected, for example by personal computers or workstations. With such a structure, the several different users connected to the network may have access to the document image management server 30. In this circumstance, the users connected to the network can retrieve and view the video image data stored in the document image management server 30.

Such a system of the present invention may find several uses. One usage of the system of the present invention is to ensure complete redundancy of copied documents. More particularly, as one operation in the present invention every copy made by the peripheral unit 10 may be stored in the document image management server 30. This ensures that all copied documents are available to any authorized personnel.

Alternatively, the present invention can be implemented such that a user determines which documents copied by the multi-function digital copier peripheral unit 10 are stored in the document image management server 30. In this case, the user may be an operator of the peripheral unit 10 or may be a system controller. In this instance, the user may provide an indication when a copy job is to be executed as to whether the documents being copied in the copy job are to be saved to or filed in the document image management server 30. This indication can be provided in many ways. An overall system controller can predesignate certain copy jobs for which video image data of copied documents are to be stored in the document image management server 30, a touch pad can be attached to the peripheral unit 10 so that the user can indicate whether the peripheral unit 10 is to operate in a "file mode" and thereby transfer video image data of the copied documents to the capture controller 20, the peripheral unit 10 can have its own "file mode set" button so that the user can indicate whether video image data from documents to be copied are to be transferred to the capture controller 20, etc. The "file mode" indicates that documents of a copy job are to have video image data therefrom provided to the document image management server 30. The system of the present invention could of course also operate in a default mode in which all video image data of documents to be copied are designated to be transferred to the capture controller 20 unless a "file mode deselect" indication is provided, in any of the manners or equivalents noted above.

Figure 2:
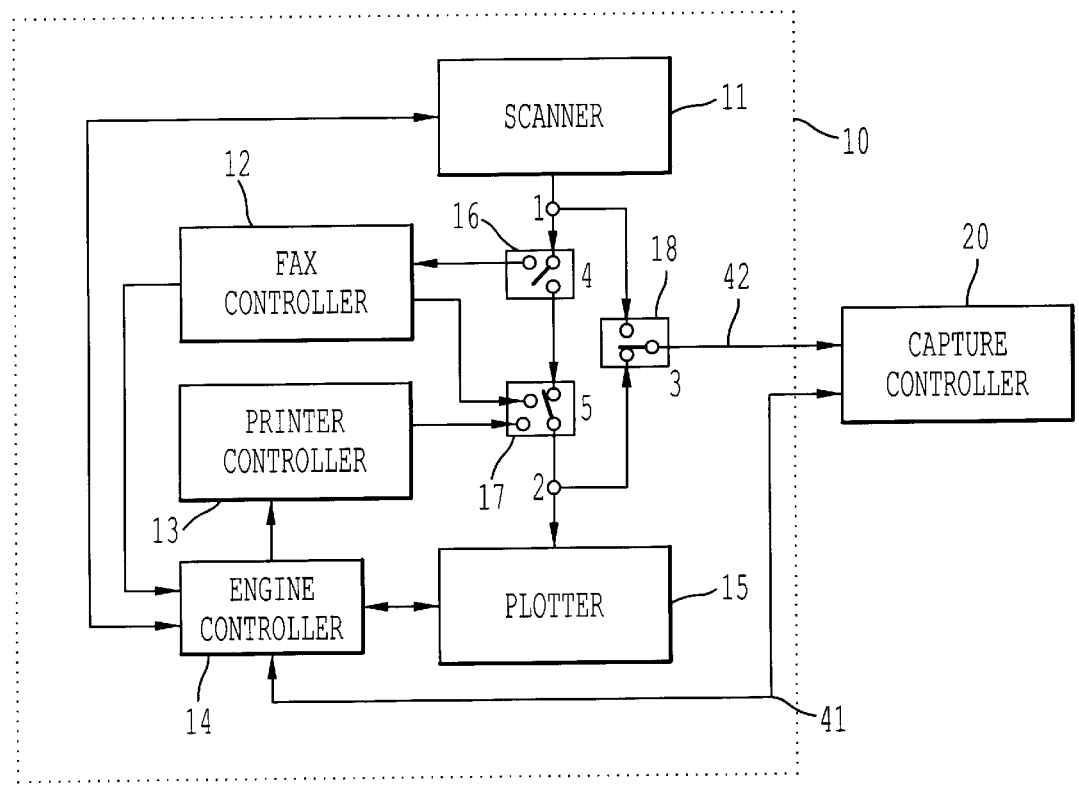
FIG. 2 shows details of the peripheral unit of FIG. 1.

FIG. 2 shows details of the peripheral unit 10, and again particularly when the peripheral unit 10 is implemented as a multi-function digital copier. As shown in FIG. 2, the peripheral unit 10 includes a scanner 11, a fax controller 12, and a printer controller 13. The operations of such devices are well known. The peripheral unit 10 also includes a plotter 15 to print image data. The peripheral unit 10 also includes an engine controller 14 which provides various control data to each of the scanner 11, fax controller 12, printer controller 13, and plotter 15. The operation of such an engine controller 14 is also well known. The engine controller 14 also provides and receives control data, i.e., command/status data, on the communication line 41, which again as noted above may typically be an RS232 serial communication line, to and from the capture controller 20.

The peripheral unit 10 also includes various switches 16, 17, and 18. The output of switch 18 provides raw video image data on the communication line 42 to the capture controller 20. As noted above, the communication line 42 may typically take the form of parallel data lines with control and clock signals.

The switches 16, 17, and 18 control the output from the scanner 11, fax controller 12, printer 13, and plotter 15. These switches thereby can be set to select the unit of the peripheral unit 10 to provide the raw video document image data provided to the capture controller 20.

One common instance of providing raw video image data is providing raw video image data from the scanner 11 when the multi-function peripheral unit 10 is used as a copier. As discussed above, the high speed multi-function digital copier as peripheral unit 10 operates effectively as it has a high scanning speed. However, if the capture controller 20 cannot process raw video image data at the same high speed that the scanner 11 can scan and output such raw video image data in the multi-function digital copier 10, then the scanner 11 will have to slow down. As also discussed above, this defeats a purpose of the multi-function digital copier 10 operating at high speed and reduces productivity.

Figure 3:
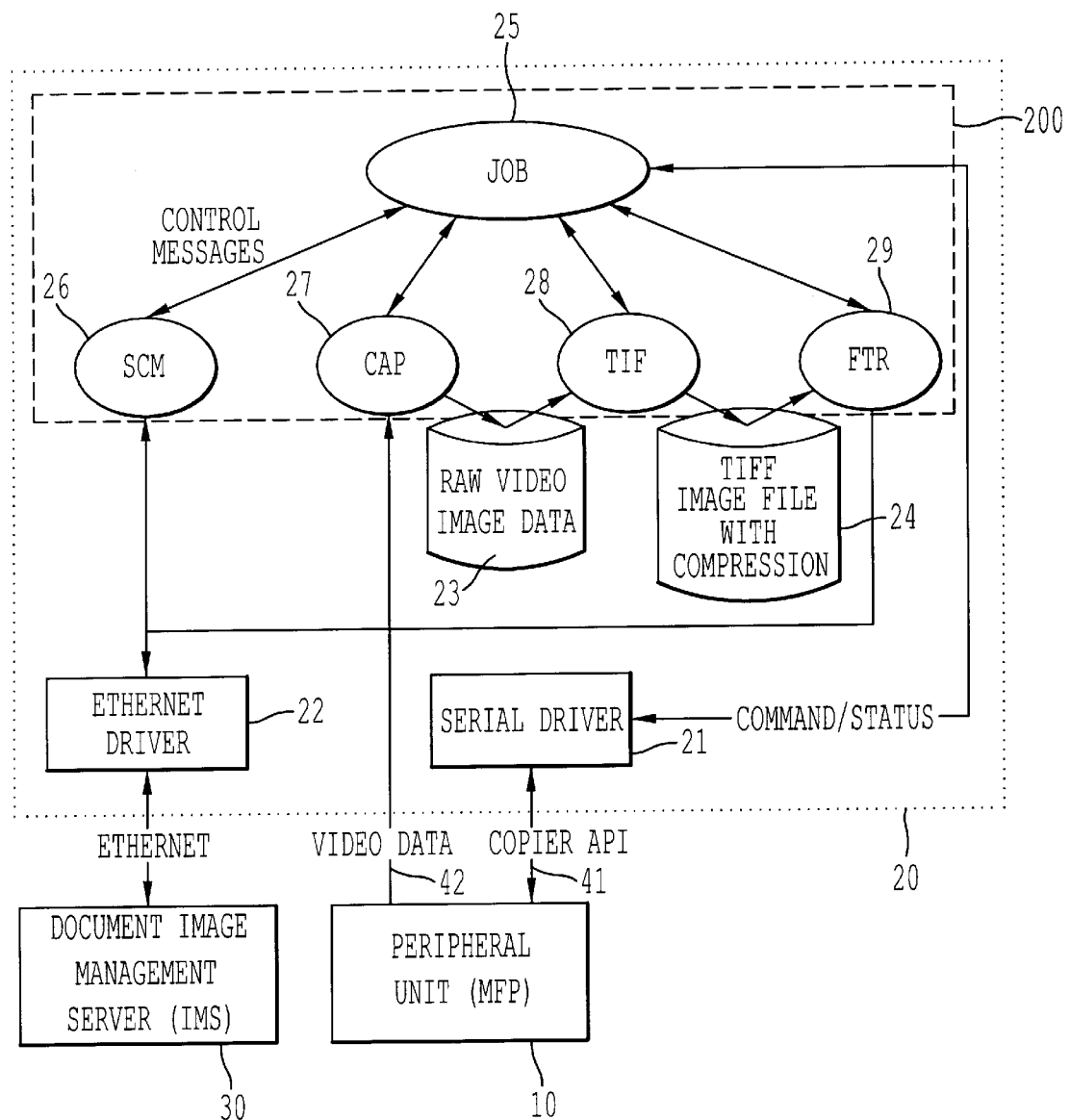
FIG. 3 shows details of the capture controller of FIG. 1.

FIG. 3 shows details of the capture controller 20. As shown in FIG. 3, the capture controller 20 includes a serial driver 21 which is connected to the communication line 41 connected to the peripheral unit 10. The serial driver 21 exchanges command/status data with the peripheral unit 10. The capture controller 20 also includes an Ethernet driver 22 connected to the document image management server 30 to exchange data with the document image management server 30.

The capture controller 20 further includes several control processes indicated as JOB process 25, server communication process (SCM) 26, video image capture process (CAP) 27, image compression and TIFF format conversion process (TIF) 28, and image file transfer process (FTR) 29. These processes 25–29 effectively form a control processor 200 of the capture controller 20.

The capture controller 20 also includes two different memories 23 and 24. The memory 23 stores raw video image data from the video data image capture process CAP 27 and provides such raw video image data to the image compression and format conversion process TIF 28. The second memory 24 receives compressed and format converted video image data from the TIF 28 and stores such data, and then subsequently provides such compressed video image data to the image file transfer process FTR 29.

As also shown in FIG. 3, the peripheral unit 10 also provides the raw video image data on the communication line 42 to the video image capture process CAP 27. Further, the image file transfer process FTR 29 provides the compressed video image data to the Ethernet driver 22, which then in turn provides such compressed video image data to the document image management server 30. Also, the JOB process 25 is an overall main process which controls the other processes SCM 26, CAP 27, TIF 28, and FTR 29. The JOB process 25 also exchanges command/status data with the peripheral unit 10 through the serial driver 21.

An overall operation of the present invention will now be discussed, and then control operations specifically executed by each of the processes in FIG. 3 will be further detailed.

The capture controller 20 as shown in FIGS. 1–3 operates such that the peripheral unit 10 provides raw video image data to the video image capture process CAP 27. Control data, i.e., command/status data, is also provided from the peripheral unit 10 to the serial driver 21 through the serial communication line 41.

As discussed above, a system which immediately starts to compress raw video image data provided from the peripheral unit 10 will suffer from a drawback in that the compression operation is more time consuming than the scanning operation performed in the peripheral unit 10. Stated another way, in such a system the video image capture process CAP 27 will receive raw video image data from the peripheral unit 10 faster than the raw video image data can be compressed and then sent to the document image management server 30.

To avoid such a situation, in the present invention the capture controller 20 does not perform a compression of the received raw video image data from the peripheral unit 10 until all of the raw video image data is provided from the peripheral unit 10. In the present invention the video image capture process CAP 27 initially immediately stores the raw video image data received from the peripheral unit 10 into the memory 23. Only after all of the raw video image data is received from the peripheral unit 10 and stored in the memory 23 will the capture controller 20 of the present invention then operate to compress the raw video image data, and subsequently transfer the compressed video image data to the document image management server 30.

Under these circumstances, the memory 23 must be able to store a large amount of data because the raw video image data provided from the peripheral unit 10 will be uncompressed and will be of a great volume. Therefore, the memory 23 should be a high capacity memory such as a hard disk. A hard disk is well suited for the memory 23 because a hard disk can store a large amount of data at a high speed, and is now a relatively low cost device. The memory 24 may also be a hard disk, and may have a smaller capacity than the memory 23 since the memory 24 receives compressed video image data.

In the present invention, after all the raw video image data is stored to the memory 23, then the image compression and TIFF format conversion process can be executed by TIF process 28, and then the compressed video image data is stored in the memory 24. The compressed video image data stored in the memory 24 is then transferred by the image file transfer process FTR 29 to the Ethernet driver 22, which in turn transfers the compressed video image data to the document image management server 30.

As noted above, the operation of compressing raw video image data performed by the image compression and format conversion process TIF 28 is relatively time consuming. A situation may arise in which after a first copy job has been completed and the raw video image data from the first copy job has been stored in the memory 24, and the image compression and format conversion process TIF 28 is executing, a second copy job begins to be executed by the peripheral unit 10. In this situation, both of the image compression and format conversion process TIF 28 and the image file transfer process FTR 29 are suspended so that all resources can be dedicated to the video image capture process CAP 27. Such a suspending of processes TIF 28 and FTR 29 when the process CAP 27 is executing allows the scanning operation in the peripheral unit 10 to again be performed at high speed since only the video image capture process CAP 27 is executed until all of the raw video image data from the second copy job is stored to the memory 23. After the second copy job is completed and all the raw video image data therefrom is stored in the memory 23, then the image compression and format conversion process TIF 28 and image file transfer process FTR 29 can be resumed for the raw video image data from the first job stored in the memory 23.

The specific operations performed by the various processes 25–29 forming the control processor 200 of the capture controller 20 will now be discussed in further detail.

The JOB process 25 is mainly responsible for controlling all of the other resource processes SCM 26, CAP 27, TIF 28, and FTR 29, and for communicating command/status information with the peripheral unit 10 through the serial driver 21.

The JOB process 25 receives commands from the document image management server 30 through the server communication process SCM 26, and saves information such as user-ID information, passwords, date and time data, etc. The JOB process 25 also receives a "capture job start" command from the peripheral unit 10, indicating that a copy job for which a "file mode" is designated is to begin, and then creates a "job-ID" directory indicating jobs to be executed in the "file mode", and any other desired related information, and then returns a "job start" message to the video image capture process CAP 27. The "job start" message indicates to the video image capture process CAP 27 that a video image capture job is to begin.

The JOB process 25 further receives a "capture page start" command from the peripheral unit 10, indicating that raw video image data of a specific page of a document is starting to be generated, e.g. scanned. The JOB process 25 also sends "page size" and "page resolution" data to the various other processes as needed, indicating the noted information of the raw video data of the page being scanned.

The video image capture process CAP 27 processes video image data for each page of a document scanned in the peripheral unit 10 and saves such data under the "job-ID" directory, and sends a "page end" message to the JOB process 25 after saving each page of the raw video image data to the "job-ID" directory. After the copying job has been completed, the JOB process 25 receives a "capture job end" signal from the peripheral unit 10, sends a "job end" message to the video image capture CAP process 27 and, assuming that a second copying job is not being executed, sends a "job start" message to the image compression and format conversion process TIF 28 to start the TIFF conversion of the raw video image data to compressed video image data.

The TIF process 28 reads each captured raw video image from the memory 23, compresses each captured raw video image, and saves a compressed TIF image file therefor. After the compression and format conversion has been completed for each page, the TIF process 28 sends a "page end" signal to the JOB process 25 and the JOB process 25 then deletes the raw video image data which has been compressed from the "job-ID" directory.

After the TIF conversion has been executed for all raw video image data of a job stored in the memory 23, a "job end" signal is generated from the TIF process 28 and, assuming that a second copy job is not being executed, the JOB process 25 sends a "job start" command to start the file transfer process FTR 29 to send all of the compressed video image data from the memory 24 to the document image management server 30.

When the FTR process is completed the JOB process 25 receives a "job end" signal from the FTR process 29, and the JOB process 25 then deletes the "job-ID" directory for the transferred compressed video image data.

After receiving all of the "page end" and "job end" signals from each process, the JOB processor 25 sends a "notify capacity" command to the SCM process 26 to provide an indication of the capacity of the memories 23 and 24, e.g., how much hard disk space is still available in these memories.

The server communication process SCM 26 provides initialization and connection to the document image management server 30 through Ethernet driver 22, receives commands from the document image management server 30 and forwards such commands as messages to the JOB process 25, and receives messages from the JOB process 25 and sends such messages as IMS commands to the document image management server 30.

The image capture process CAP 27 receives the "job start" commands from the JOB process 25 and sets up a raw video image capturing operation in response thereto, and sends a confirmation "job start" message to the JOB process 25 to indicate that the CAP 27 has begun video image capture, or sends an "exception" message if there is an error in the video image capture process CAP 27 and it cannot capture the raw video image data from the peripheral unit 10.

The video image data may also come to the image capture process CAP 27 as a software interrupt, in which case the image capture process CAP 27 sends a "page start" message to the JOB process 25, captures the raw video image data to the memory 23, and then sends a "page end" message to the JOB process 25 after each page of the raw video image data has been saved to the memory 23.

The image capture process CAP 27 also receives a "job end" control command from the JOB process 25 and then sends a "job end" confirmation signal to the JOB process 25 with an indication of the total page numbers stored in the memory 23.

The image compression and format conversion process TIF 28 reads the raw bit map video image data from the "job-ID" directory in the memory 23, compresses the raw bit map image data, for example with an MMR operation, and saves a TIFF image file under the "job-ID" directory. An MMR compression operation is a "modified modified read (MMR)" compression operation, which is a CCITT standard compression method for a G4 facsimile, and is one example of a compression operation which can be executed by the TIF process 28. Further, the TIF process 28 can generate data files in a tag image file format (TIFF), which is a standard image format by adobe. The TIF process 28 also deletes the source raw video image file after the conversion is successfully performed, and after all the raw video image files have been compressed the TIF process 28 converts the document description file under the "job-ID" directory into an XML file indicating that the raw video image data has been compressed.

The file transfer process FTR 29 connects to the document image management server with, e.g., an FTP protocol, and may log on as a specified user name with password, etc. The FTP protocol is an example of a protocol which can be used, and such a protocol is a popular protocol for file transfer in the Internet. The FTP (file transfer protocol) is defined as RFC959 (RFC stands for request for comments) and most Unix machines, Netware and NT servers support such a protocol for file transfer. The file transfer process FTR 29 may also move into a spooler directory, create an appropriate directory with name, date, time, etc., and then move into the created directory. The file transfer process FTR 25 also sends a "job start" message to the JOB process 25 when it begins to transfer files to the document image management server 30 through the Ethernet driver 22, and after all files are transferred the file transfer process FTR 29 sends a "job end" signal to the JOB process 25. The JOB process 25 then deletes the "job-ID" directory and its contents in response to this "job end" signal.

FIGS. 4–8 show specific flows of data between and the operations of the various processes 25–29 forming the control processor 200 shown in FIG. 3.

Figure 4:
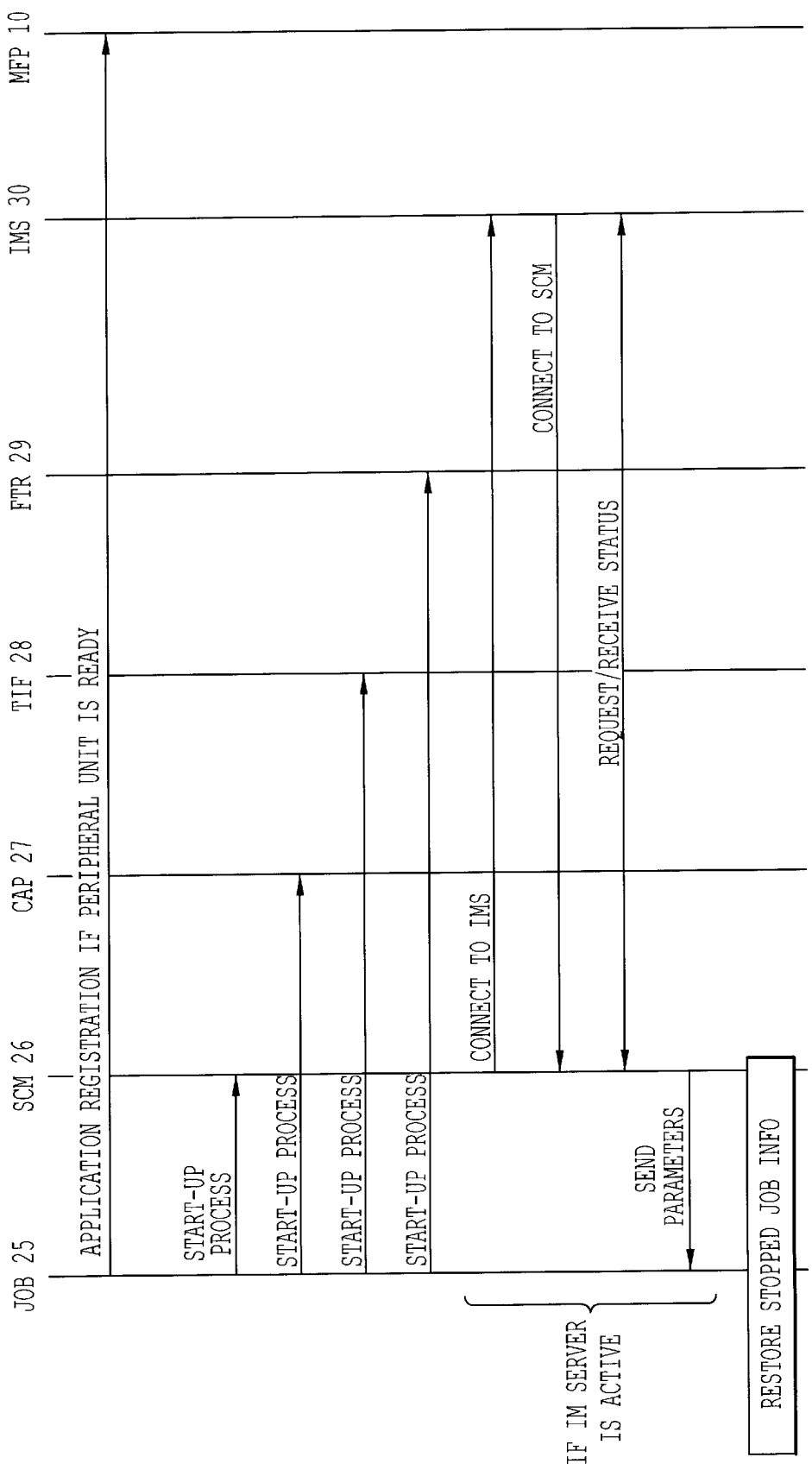
FIG. 4 shows an initial boot-up operation performed by the capture controller of FIG. 3.

FIG. 4 specifically shows a boot-up operation performed when the capture controller 20 is initially powered on.

As shown in FIG. 4, in an initial operation the JOB process 25 sends an application registration signal to the multi-function peripheral unit (MFP) 10 to indicate the capture controller 20 as a recognized external device and to determine whether the multi-function digital copier as peripheral unit 10 is ready. At boot-up the JOB process 25 further sends "start-up process" signals to each of the processes SCM 26, CAP 27, TIF 28, and FTR 29. These "start-up process" signals indicate that these processes 26–29 should be initialized. The SCM 27 then connects to the document image management server IMS 30 through the Ethernet driver 22, see the "connect to IMS" signal, and if a proper connection is made the IMS 30 then returns a "connect to SCM" signal to the SCM 26. The SCM 26 and the IMS 30 then exchange status information, see the "request/receive status" signal, and the SCM 26 then sends the status data it receives to the JOB process 25, see "send parameters" signal.

Further, a "restore stopped job info" operation can be executed if the capture controller 20 was turned off while a job was being executed. If the capture controller 20 was not turned off during the execution of a job, there will be no job to be restored.

Figure 5:
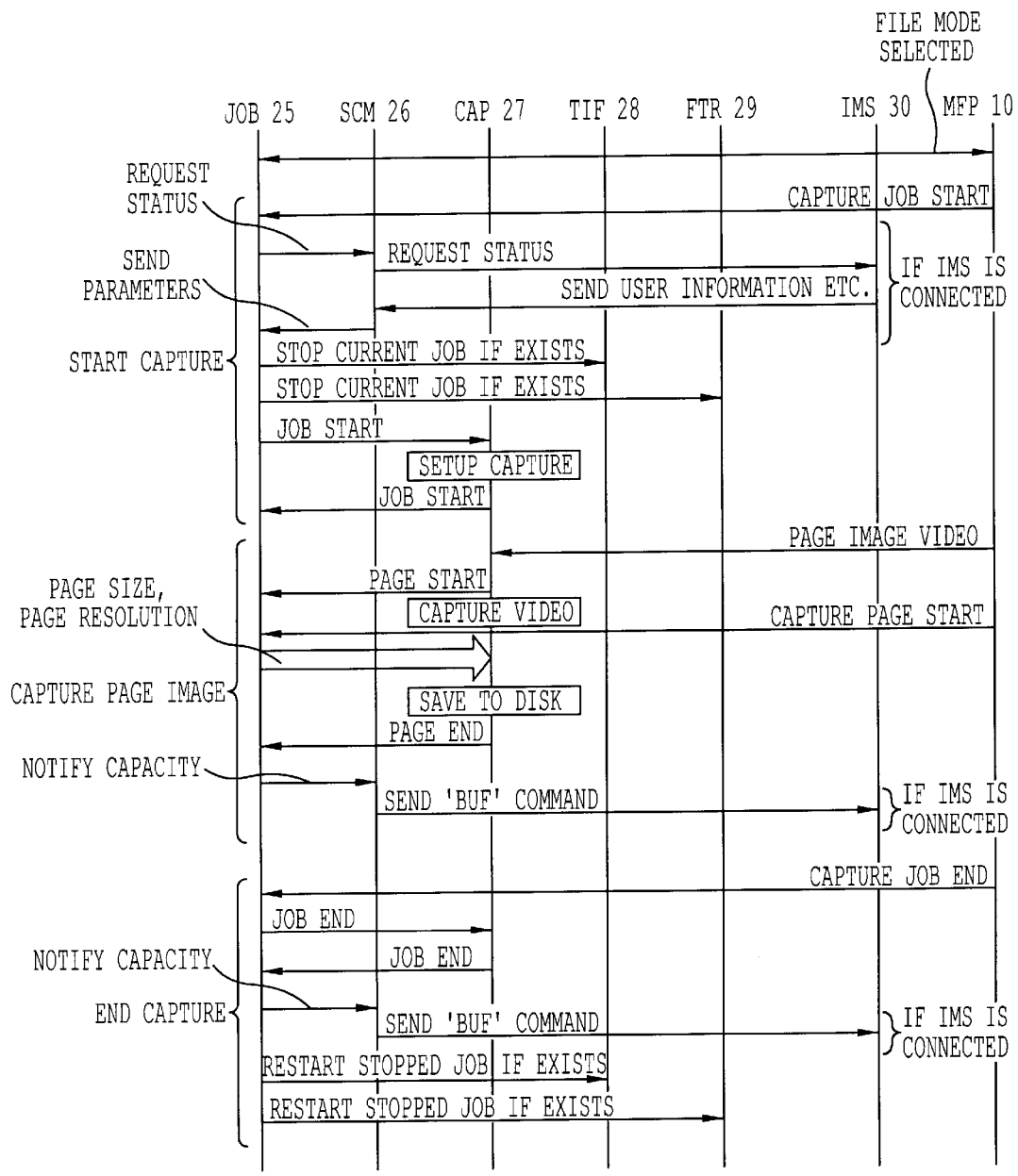
FIG. 5 shows a capture image operation performed by the capture controller of FIG. 3.

FIG. 5 shows the operation for capturing the raw video image data performed in the capture controller 20.

As shown in FIG. 5, initially it must be determined whether a "file mode" has been selected. As noted above, one operation in the present invention is that either a user or an operator can determine whether a document to be copied should have the image data therein stored in the document image management server 30. This determination can be performed in several ways as noted above. Thus, as shown in FIG. 5 it must initially be determined whether a "file mode" has been selected and that thereby captured video image data is to be transferred to the document image management system 30. If the capture controller 20 is programmed to capture all video images from all documents from the MFP 10, then it will be unnecessary to determine if the "file mode" is selected.

Then, a "start capture" routine is executed with the MFP 10 sending a "capture job start" signal to the JOB process 25. The JOB process 25 then requests the status of the IMS through the SCM 26, see "request status" signal, and the IMS 26 then returns the requested information, "send user information etc." and "send parameters", through the SCM 26 to the JOB process 25. If either of the TIF process 28 or FTR process 29 is currently being executed at this time, these processes are then stopped by the "stop current job, if exists" commands output from the JOB process 25. As noted above, one feature of the present invention is that when raw video image data is to be captured in the CAP 27 all other processes are terminated so that the video image data can be captured at high speed, to prevent reducing a scanning speed in the multi-function peripheral unit 10.

The JOB process 25 then sends a "job start" signal to the CAP process 27 to thereby set up a capture operation to capture the raw video image data from the peripheral unit 10, and the CAP process 27 then returns a confirmation "job start" signal to the JOB process 25.

The next operation in FIG. 5 is the operation for actually capturing a page of raw video image data, i.e., a "capture page image" operation. As shown in FIG. 5, the MFP 10 sends a first page of raw video image data, the "page image video" signal, to the CAP process 27, which in turn sends a "page start" signal to the JOB process 25. These operations indicate that the CAP process 27 has captured raw video image data of the first page. The MFP 10 also sends "capture page start" data along the serial communication line 41 indicating the parameters of the sent page of raw video image data, and in response the JOB process 25 sets up the page size, page resolution etc., in the CAP process 27. These operations result in saving the raw video image data to the memory 23 for a first page of the document, see "save to disk" box. The CAP process 27 then sends a "page end" signal to the JOB process 25 indicating that raw video image data of the first page has been saved to the memory 23. The JOB process 25 then sends a "notify capacity" signal to the SCM 26 to indicate the amount of available space in the memory 23, i.e., the amount of available hard disk space. Then the SCM 26 process sends a "send 'buf' command" to the IMS 30 providing an indication to the IMS 30 of the capacity of the memory 23 in the capture controller 20.

In FIG. 5 these processes for the "capture page image" operation are repeated for each page to be copied in the MFP 10. When a last page of a job is reached an "end capture" operation is executed in which the MFP 10 initially sends a "capture job end" signal to the JOB process 25, which in turn sends a "job end" signal to the CAP process 27, which returns a confirmation "job end" signal to the JOB process 25. The JOB process 25 then again sends a "notify capacity" signal to the SCM process 26, which again sends the "send 'buf' command" to the IMS 30 again providing the IMS 30 with an indication of the remaining capacity of the memory 23 in the capture controller 20.

Further, if during the "end capture" operation any processes were being performed by the TIF 28 or the FTR 29 which were earlier stopped, these processes are then resumed with "restart stopped job, if exists" commands from the JOB process 25.

Figure 6:
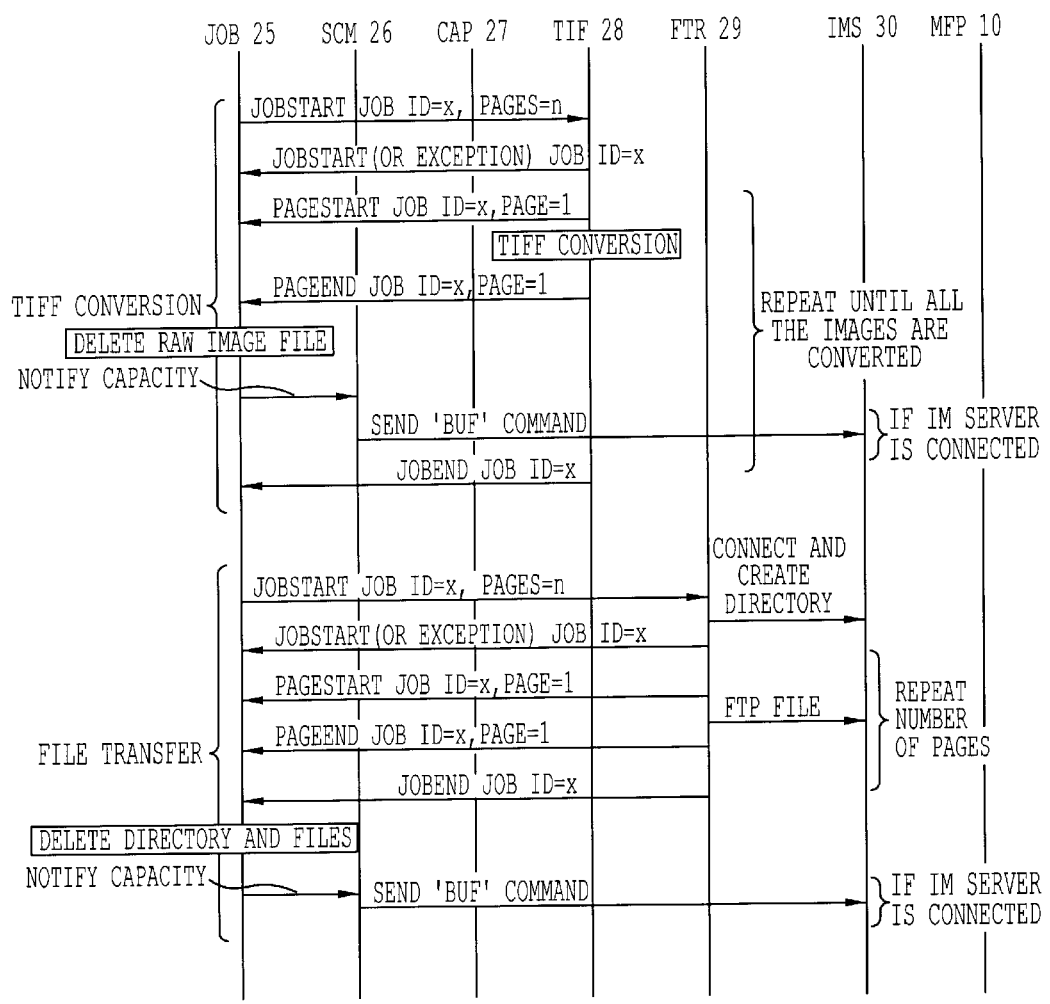
FIG. 6 shows a conversion and transfer image operation performed by the capture controller of FIG. 3.

FIG. 6 shows the operations executed for the compression of the raw video image data and then the subsequent transfer of the compressed video image data.

FIG. 6 initially shows the "TIFF conversion" process to compress and format the raw video image data captured and stored in the memory 23.

As shown in FIG. 6, in a first operation of the "TIFF conversion" the JOB process 25 sends a "job start job ID=X, pages=n" signal to the TIF process 28 indicating a job with ID=X and n number of pages in the job. The TIF process 28 then returns a "job start" signal indicating that it can accept the job or an "exception" signal indicating that it has some sort of error. The TIF process 28 then sends a "page start job ID=X, page=1" signal indicating that it is now converting page 1 of the job with ID=X, i.e., that the raw video image data for the first page of the job ID=X is being compressed and format converted. When the TIF process 28 has completed the compression and format conversion for the first page, a "page end job ID=X, page=1" signal for job ID=X, page=1 is sent from the TIF process 28 to the JOB process 25, and at this time the raw video image data which has now been compressed and file formatted is deleted from the memory 23 by the JOB process 25, see "delete raw image file" box. The JOB process 25 then again sends the "notify capacity" and "send 'buf' command" signals similarly as noted above. These processes are then completed for each page of the raw video image data for the job ID=X stored in the memory 23. When the last page of the job ID=X has been compressed and format converted a "job end, job ID=X" signal is sent from the TIF process 28 to the JOB process 25. This completes the "TIFF conversion" operation.

Then, the "file transfer" operation is executed as shown in the lower portion of FIG. 6.

As shown in FIG. 6, in the "file transfer" operation initially the JOB process 25 sends a "job start job ID=X, pages=n" command for the job with ID=X of n pages to the FTR process 29, to indicate that the FTR process 29 is to begin transferring the compressed video image data for the job ID=X of n pages which is now stored in the memory 24. The FTR 29 then sends a "connect and create directory" signal to the IMS 30 indicating in which directory the compressed video image data is to be stored. This directory can be based on various parameters as desired, such as based on a user ID of the user who executed the copy command, a machine ID indicating the multi-function digital copier 10 which created the copy, time information as to the time of the copy operation, etc. The directory is created so that when the compressed video image data is sent to the IMS 30 it can be stored in a manner that it can be easily found and retrieved.

The FTR process 29 then returns a "job start" indication to the JOB process 25 if it is operational and has started the file transfer, or an "exception" indication if an error arises. Then, the FTR process 29 sends a "page start job ID=X, page=1" signal to the FTR 29 indicating it is beginning to transfer the compressed video image data for page 1 of job ID=X, and the FTR process 29 then transfers such data as an FTP file to the IMS 30. When the transfer of the FTP file of page 1 is completed, the FTR process 29 then sends a "page end job ID=X, page 1" indication to the JOB process 25. These processes are completed for each page of the job with the ID=X, and when the last page has been transferred from the FTR 29 to the IMS 30 a "job end job ID=X" signal is sent from the FTR process 29 to the JOB process 25. At this time the directory and files of the job ID=X are deleted by the JOB process 25. The JOB process 25 then also again sends the "notify capacity" command and "send 'buf' command" signal as above.

One thing that should be noted from the operation in FIG. 6 is that the "file transfer" operation is not executed for a job until all of the data of that job have been compressed and stored in the memory 24. That is, in the operation of the present invention as shown in FIG. 6 the "TIFF conversion" operation and the "file transfer" operation are not executed in parallel for any one existing job. In the example shown in FIG. 6 the job ID=X must be completely converted to compressed video image data prior to transferring any of the compressed video image data of the job ID=X from the FTR 29 to the IMS 30. Executing such jobs serially ensures simplicity of operation and file integrity. However, it should be noted that it is possible to execute the "TIFF conversion" and "file transfer" operations in parallel if desired.

However, it should be noted that the FTR process 29 can be executed for a previous job while the TIF process 28 is being executed for a current job. More particularly, when all of the page data for a job ID=X has been provided to the second memory 24, the FTR process 29 can transfer such compressed video image data to the IMS 30 in parallel with other processes being executed in the capture controller 20. For example, the FTR process 29 can transfer compressed video image data for a job ID=X while the TIF process 28 is compressing and converting raw video image data for a job ID=X+1. Of course, and as noted above, each of these processes TIF 28 and FTR 29 will be suspended if the CAP 27 is being executed for a further job ID=X+2. Further, in the embodiment noted above in which the TIF process 28 and the FTR process 29 are being executed serially, the FTR process 29 for the job ID=X+1 will not be executed until all of the raw video image data stored in the memory 23 for the job ID=X+1 is compressed by the TIF process 28.

Figure 7:
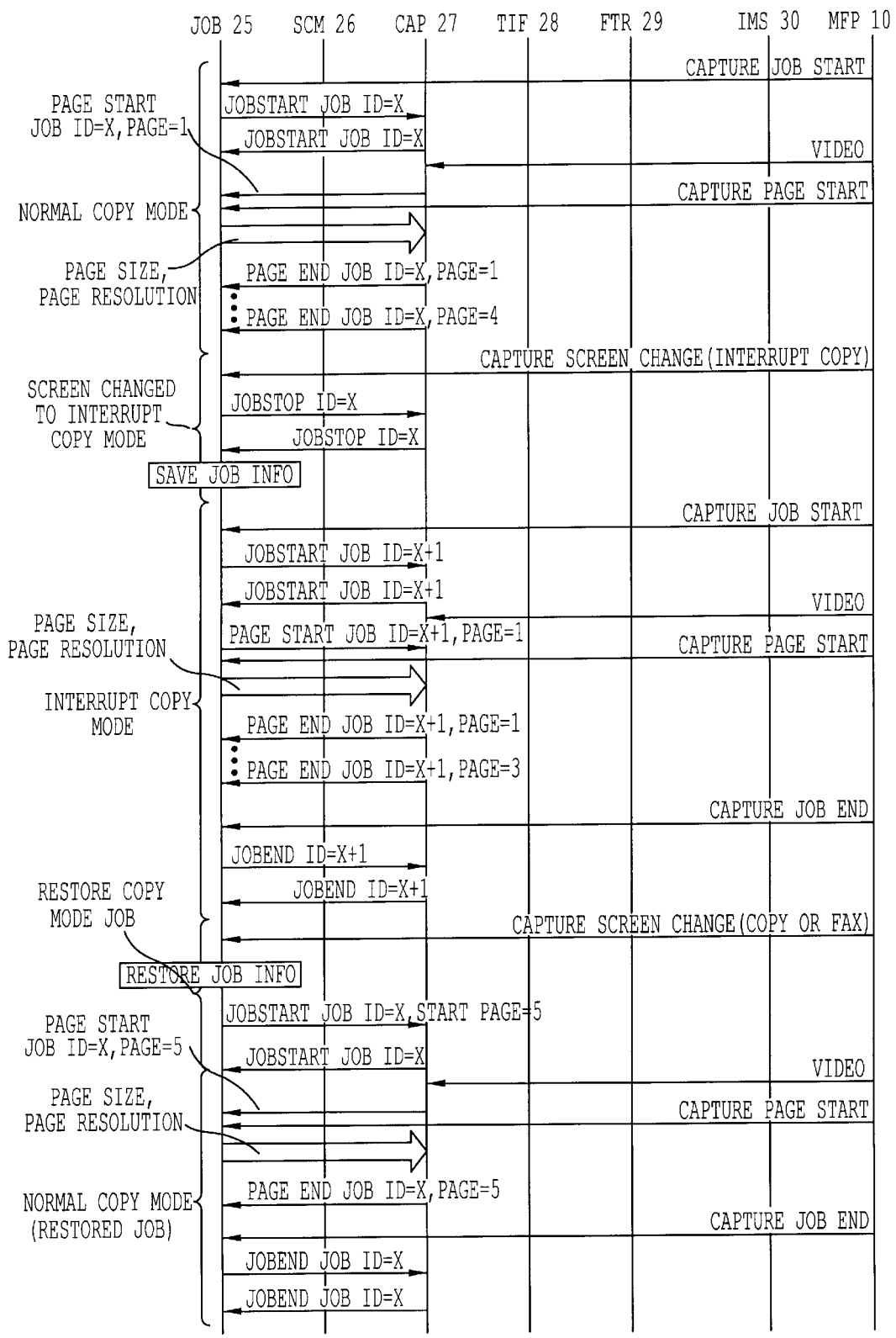
FIG. 7 shows an interrupt operation performed by the capture controller of FIG. 3.

FIG. 7 shows an operation in an interrupt copy mode which may take place if one copy job is being executed and then a second job with a higher priority, which may be a fax job, printing job or another copy job, to be executed by the MFP 10 begins to be executed before the first copy job is completed. The operations shown in FIG. 7 follow the same operations as discussed above but provide the additional operations of changing a screen on the multi-function digital copier 10 from a normal copy mode to an interrupt mode, saving job information from the interrupted copy job when an interrupting copy job is executed, and then returning to the interrupted copy job after the interrupting copy job is completed.

More particularly, FIG. 7 shows an initial operation in a "normal copy mode" similarly as shown above in FIG. 5 for a job ID=X. Then, an interrupt can take place and a screen on the MFP 10 is changed to an interrupt copy mode, in which case the job information for the interrupted copy job is saved, see "save job info" box in FIG. 7. Then, the "interrupt copy mode" is executed, in which case the same operations of the "normal copy mode" are executed for the interrupting copy job, noted as job X+1 in FIG. 7. When this interrupting copy job ID=X+1 is completed, the job information from the interrupted copy job ID=X is restored, see "restore job info" box in FIG. 7, and then the "normal copy mode" is continued to be executed for the original job ID=X.

The operation in FIG. 7 provides the control in a situation in which a job, for example a fax or printing job or another copy job, with a higher priority interrupts a copy job with a lower priority.

In the operation shown in FIG. 7, an example is provided in which a job with a job ID=X has five total pages and is interrupted after the fourth page of raw video image data is captured, and the interrupting job which has a job ID=X+1 has three pages. As shown in FIG. 7, in this operation of the present invention the first four pages of raw video image data of the job ID=X are captured, the interrupt is then provided and a screen is changed to an interrupt copy mode, the interrupting copy job ID=X+1 of three pages is then executed, a restoration operation is executed to return to the job ID=X, and then the fifth page of the job ID=X is captured.

Figure 8:
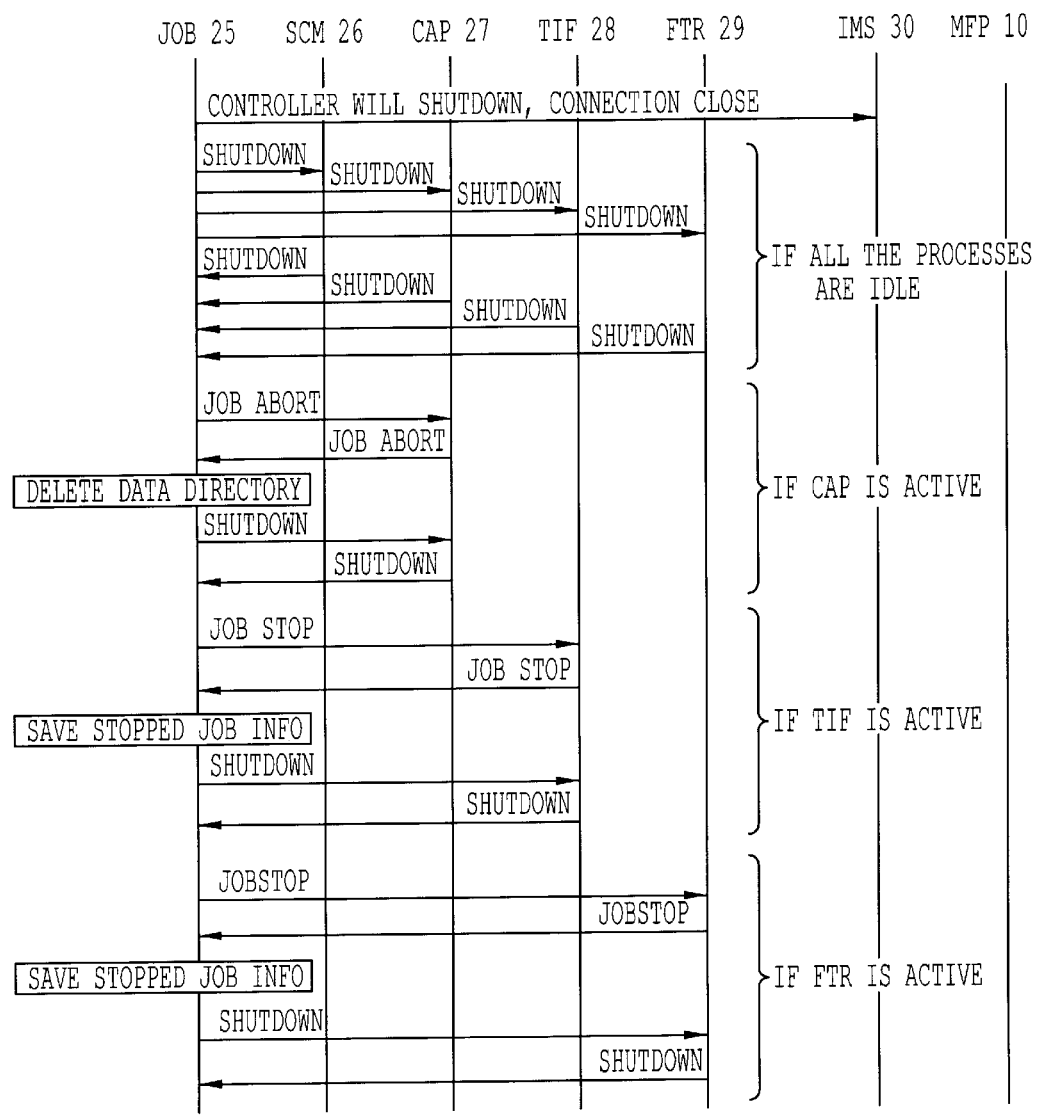
FIG. 8 shows a shut-down operation performed by the capture controller of FIG. 3.

FIG. 8 shows an operation executed in the capture controller 20 in a shutdown mode, for example if the capture controller 20 is turned off.

As shown in FIG. 8, initially the JOB process 25 sends a "controller will shutdown, communication close" command to the IMF 30 to terminate the connection between the capture controller 20 and the IMS 30. Then, "shutdown" commands are sent to each of the processes SCM 26, CAP 27, TIF 28, and FTR 29, and each of these processes then returns a "shutdown" confirmation signal confirming that they have shutdown.

However, if the CAP process 27 is active, a "job abort" command is sent to the CAP process 27, a confirmation "job abort" is returned from the CAP process 27 to the JOB process 25, the data in the directory is deleted, and then "shutdown" and confirming "shutdown" commands are exchanged between the JOB process 25 and the CAP process 27. That is, in this operation if a copy operation is being executed and raw video image data has started to be captured by the CAP process 27, if a shutdown occurs before the job is completed, i.e., before all pages of the document of the job have been captured, the job is aborted and none of the previously captured raw video image data is stored. This operation ensures file integrity.

Stated another way, in this operation if a copy job has 10 pages and the capture controller 20 is turned off after raw video image data of only 5 pages of the copy job have been captured and saved to memory 23, these first five pages of raw video image data are deleted from the memory 23.

The next operation in FIG. 8 shows the operation if the TIF process 28 is active, in which case after exchanging "job stop" commands between the JOB process 25 and the TIF process 28, the job information of the stopped job is saved, see "save stopped job info" box. In this situation, as the data has already stored in the second memory 24, and as the remaining data is present in the first memory 23, there is no need to abort the operation so that data of the current job can be saved, and then when the capture controller 20 is rebooted the process will be restored, as shown in the "restore stopped job info" box in FIG. 4.

Similarly, if the FTR process 29 is being executed when a "job stop" command is issued from the JOB process 25, the current status and current data is stored, and then the FTR process 29 is restored and reexecuted upon rebooting of the capture controller 20.

As discussed above, and as shown in FIGS. 1 and 3, the peripheral unit 10 exchanges control signals, "command/status" signals, with capture controller 20 along the serial communication line 41 and sends video data to capture controller 20 along the communication line 42. As discussed above, this serial line 41 may be an RS232 line and line 42 may be parallel data lines. This serial communication line 41 is provided to exchange status and command data between the peripheral unit 10 and the JOB process 25 through the serial driver 21. The command/status data includes information of a page size of the video data sent along the communication line 42.

However, in the system of FIG. 3, a problem may possibly arise if the video data provided along the communication line 42 is provided to the CAP process 27 prior to the command/status information, and particularly prior to information indicating a page size of the video data communicated, being provided from the peripheral unit 10 to the JOB process 25 through the serial driver 21.

As discussed above in detail, one object of the present invention is to ensure the high speed transfer of video data on the communication line 42 so that a scanning operation in the peripheral unit 10 does not have to be delayed. To achieve this object, the CAP process 27 quickly stores raw video image data provided from the peripheral unit 10 in the memory 23. However, the raw video image data may be supplied on the communication line 42 prior to the command/status information being transmitted from the peripheral unit 10 on the serial communication line 41 and processed in the JOB process 25. In this instance, it is possible that the raw video image data transmitted before the JOB process 25 receives and processes the command/status data will be lost because the JOB process 25 will not have appropriately set up the page size data for the received raw video image data in the memory 23.

Further, and as also noted above, in the present invention all processes except the CAP process 27 are suspended when the raw video image data is communicated from the peripheral unit 10 to the CAP process 27 on the communication line 42. This operation is performed so that the raw video image data can be stored in the memory 23 at a high speed matching the high speed that the raw video image data is generated, e.g., that a document is scanned, in the peripheral unit 10. Even in this situation a problem may arise that the process of capturing the raw video image data in the CAP process 27 and storing the captured raw video image data in the memory 23 may be slower than the operation in the peripheral unit 10 for generating the raw video image data.

Figure 9:
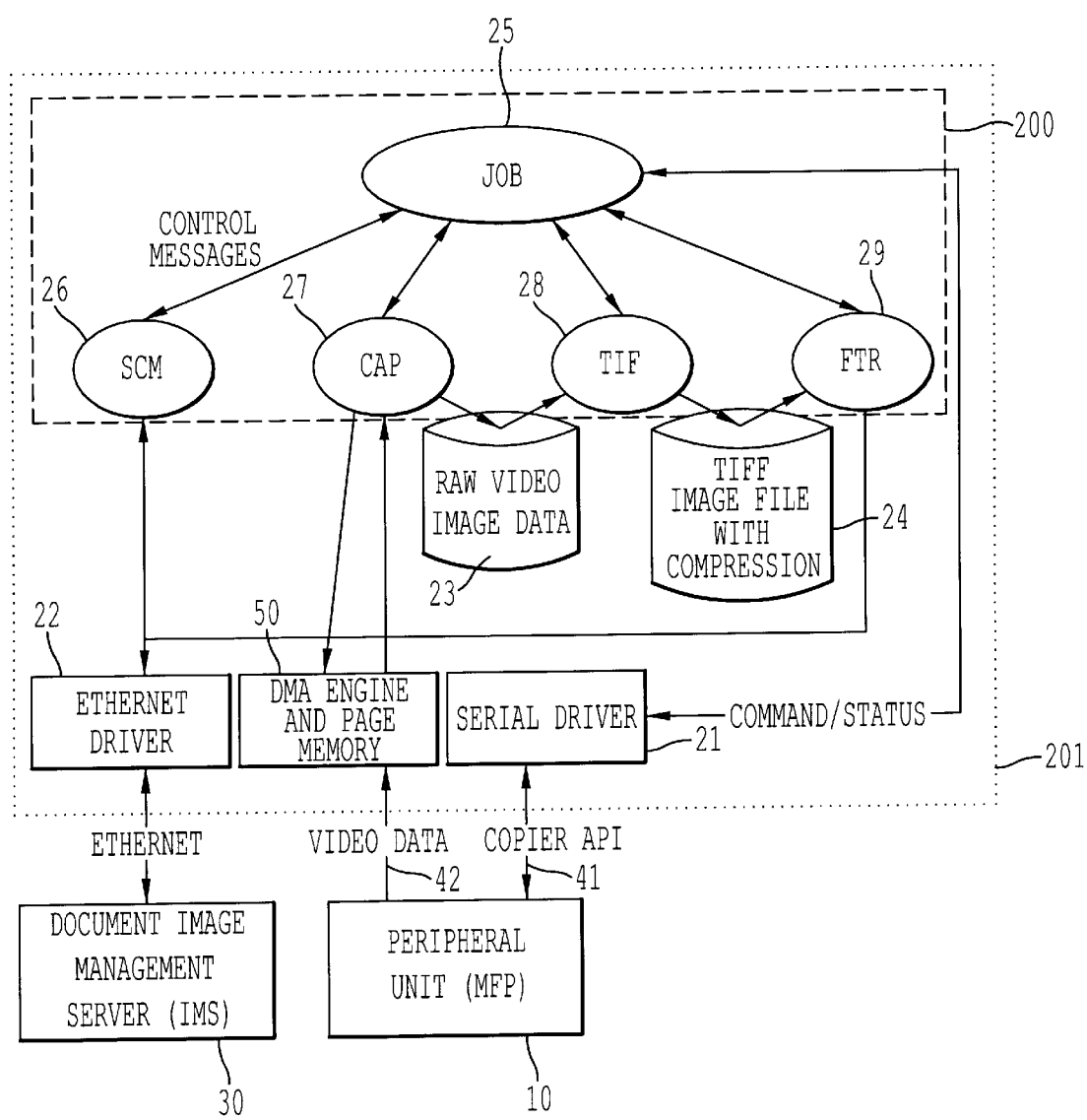
FIG. 9 shows a modification of the capture controller of FIG. 3.

To address these two situations, a modification of the capture controller 20 of the present invention as illustrated in FIG. 9 can be implemented.

More particularly, FIG. 9 shows a modified capture controller 201 according to the present invention which can be inserted into the control system of FIG. 1 in place of the capture controller 20. The capture controller 201 of FIG. 9 is identical to the capture controller 20 of FIG. 3 with the exception that the capture controller 201 of FIG. 9 further includes a DMA engine and page memory 50 connected on the communication line 42 between the peripheral unit 10 and the CAP process 27. This DMA engine and page memory 50 receives the raw video image data from the peripheral unit 10 and transfers the raw video image data to the CAP process 27. The CAP process 27 then processes the raw captured video image data in the same way and with the same operations as noted above with respect to the capture controller 20. The DMA engine and page memory 50 further operates under control of the JOB process 25 through the CAP process 27, and thus receives signals from the CAP process 27.

The capture controller 201 shown in FIG. 9 operates identically to the capture controller 20 as shown in FIG. 3 with the exception of the operation of the DMA engine and page memory 50. Therefore, a redundant description of the operation of the capture controller 201 of FIG. 9 is not provided herewith, and only the additional operation performed by the DMA engine and page memory 50 is discussed.

The DMA engine and page memory 50 operates to effectuate a DMA (direct memory access) storage of raw video image data into a page memory therein. The page memory may typically have a capacity of 32 megabytes which can correspond to approximately three pages of raw video image data for a maximum page size and configuration.

The DMA engine and page memory 50 essentially operates as a first buffer for the raw video image data provided from the peripheral unit 10 on the communication line 42. The use of a page memory immediately provides one benefit of providing a buffering of a few pages, for example three pages for a maximum page size and configuration, to address a situation in which the CAP process 27 may be slightly slower than the rate at which raw video image data is generated by the peripheral unit 10, e.g., the scanning speed of the scanner 11 of the peripheral unit 10.

However, providing just a buffer still does not address a situation in which the raw video image data is provided from the peripheral unit 10 prior to its accompanying control signals, and particularly prior to a page size signal indicating a page size of the raw video data generated from the peripheral unit 10, being output on the serial communication line 41.

To address this situation, the CAP process 27 initially controls the page memory in the DMA engine and page memory 50 to be set to a maximum page size. This ensures that no raw video image data output on the communication line 42 from the peripheral unit 10 is initially lost if the raw video image data precedes the page size data sent on serial communication line 41 to the JOB process 25 through the serial driver 21. Then, the page size of the raw video image data stored in the page memory within the DMA engine and page memory 50 is reset when the JOB process 25 receives the page size data within the command/status data communicated from the peripheral unit 10 to the JOB process 25 through the serial driver 21. The raw video image data stored in the DMA engine and page memory 50 will not be transferred from the DMA engine and page memory 50 until the proper page setting information is provided to the DMA engine and page memory 50 from the JOB process 25 through the CAP process 17. Moreover, the raw video image data output of the DMA engine and page memory 50 can be temporarily stored in a DRAM or similar memory (not shown), which is included on a motherboard of the capture controller 20, prior to being provided to the CAP process 27.

Figure 10:
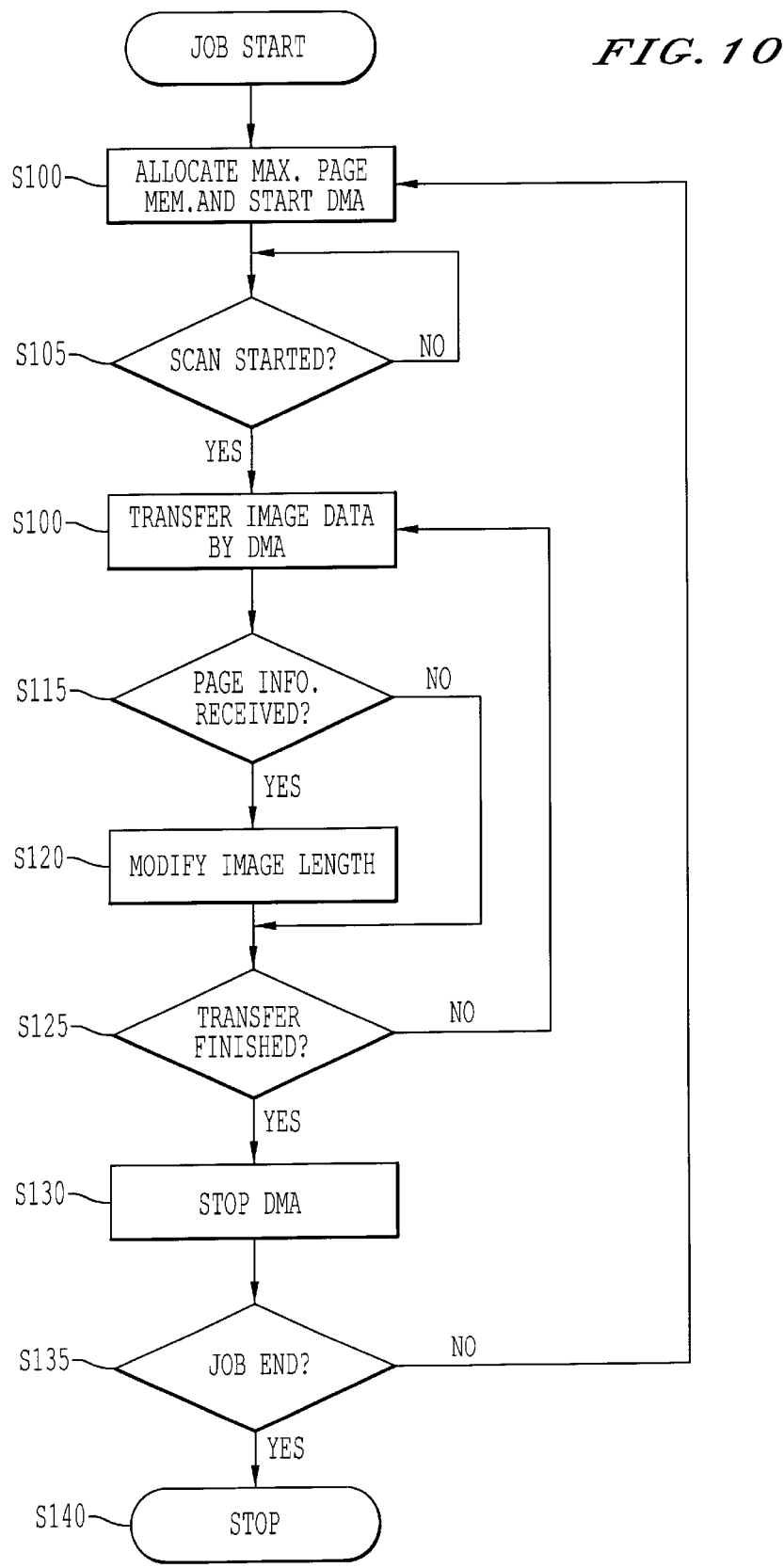
FIG. 10 shows an additional control operation performed by the capture controller of FIG. 9.
Figure 11:
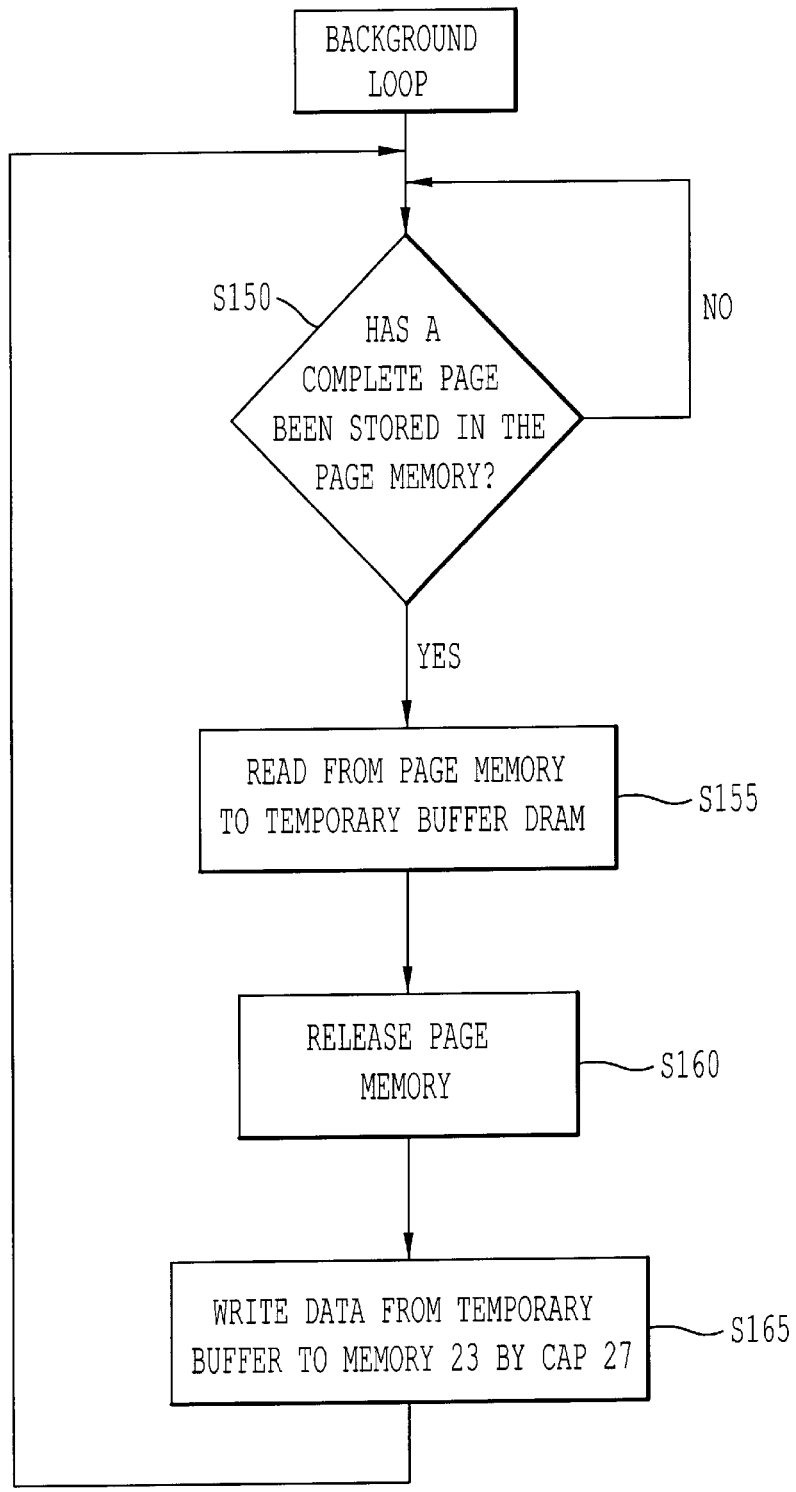
FIG. 11 shows an additional control operation performed by the capture controller of FIG. 9.

FIGS. 10 and 11 show the control processes executed in the capture controller 201 of FIG. 9 to perform such operations.

First, as shown in FIG. 10, and after a job start is indicated, in a step S100 a maximum page memory is allocated in the DMA engine and page memory 50, and then a DMA operation is started in the DMA engine and page memory 50. This operation is controlled by the JOB process 25 through the CAP process 27.

Then, the operation proceeds to a step S105 in which it is determined whether a scanning operation has started in the peripheral unit 10. When a scanning operation has started, i.e., YES in step S105, then in step S110 the raw video image data for a first page is transferred by a DMA process from the peripheral unit 10 to the DMA engine and page memory 50. This raw video image data is stored with the allocated maximum page size at this time.

Then, the operation proceeds to a step S115 in which it is determined whether the page size information has been received by the JOB process 25. As discussed above, the page size information is included in the command/status information provided from the peripheral unit 10 to the JOB process 25 through the serial driver 21. If the page size information has been received, i.e. YES in step S115, then in a step S120 the length of the image stored in the DMA engine and page memory 50 is adjusted, if needed, based on the received page size information. This operation is also executed by the JOB process 25 through the CAP process 27.

If the page size information has not been received, i.e., NO in step S115, step S120 is skipped and the operation then proceeds to step S125 in which it is determined whether the transfer of the raw video image data for the first page has been completed. If the transfer of the raw video image data for the first page has not been completed, i.e., NO in step S125, the operation then returns to step S110 and steps S110 through step S125 are then repeated. If the transfer of the raw video image data for the first page has been completed, i.e., YES in step S125, the operation then proceeds to step S130 in which the DMA operation for the first page is stopped.

The operation then proceeds to step S135 in which it is determined whether a job end signal has been received. If a job end signal is received in step S135, indicating that the last page of raw video image data has been provided, the operation stops in S140. If a job end signal is not received in step S135, i.e., NO in step S135, the operation returns to step S100 and the operation then continues for the next page of raw video image data. The operations performed in steps S100 through step S135 are then repeated for the next and subsequent pages of raw video image data until the job is ended, i.e., YES in step S135.

Further, the operation shown in FIG. 11 is also constantly being executed in parallel with the operation shown in FIG. 10. The operation in FIG. 11 is essentially a "background loop" operation which operates to continuously transfer data from the page memory of the DMA engine and page memory 50 to the CAP process 27, which transfer can be executed through a temporary memory such as a DRAM, so that such data can then be stored in the memory 23. The "background loop" operation shown in FIG. 11 is executed at times that the operation in FIG. 10 is in a waiting state or is otherwise not operating, as follows.

In a first step S150 it is determined whether a complete page of raw video image data has been stored in the page memory of the DMA engine and page memory 50. The operation will not proceed to a next step S155 until it is determined that a complete page of raw video image data has been stored in the page memory, i.e., the operation does not proceed to step S155 until the result of step S150 is a YES. When it is determined that a complete page of raw video image data has been stored in the page memory of the DMA engine and page memory 50 in step S150, i.e., YES in step S150, the operation proceeds to step S155, in which the raw video image data stored in the page memory is read and then transferred to a temporary memory, such as a DRAM.

That is, in the step SI 55 the raw video image data stored in the page memory, of the DMA engine and page memory 50, for the complete page is transferred to a temporary buffer, e.g. a DRAM. The operation then proceeds to step S160 in which the page memory of the DMA engine and page memory 50 for the stored page can be released, so that this page memory space then becomes available to store data of a subsequent page.

The operation then proceeds to step S165. In step S165 the raw video image data temporarily stored in the temporary buffer, e.g. DRAM, is then written to the memory 23 by the operation of the CAP process 27.

With these operations as discussed above, the capture controller 201 shown in FIG. 9 and as operated as shown in FIGS. 10 and 11 can provide further benefits of providing a buffer in the instance that the CAP process 27 is slightly slower than the operation in the peripheral unit 10 for generating the raw video image data to be captured. Further, the capture controller 201 shown in FIG. 9 can also further address a situation in which command/status data accompanying the raw video image data and output on the serial communication line 41 is output with a delay to the outputting of the raw video image data on the communication line 42.

This invention as described above has emphasized that the peripheral unit 10 is a multi-function digital copier. The peripheral unit 10 can take on other forms. Further, the description above has focused on the operation in the peripheral unit 10 of scanning a document to provide the raw video image data of a document. The raw video image data, however, could also be provided from the peripheral unit 10 through its fax controller 12 or printer controller 13. In this instance, the same operations as discussed above can also be implemented.

Further, the above discussion has emphasized the capture controllers 20, 201 as formed between the peripheral unit 10 and the document image management server 30. However, it should be clear that the capture controllers 20, 201 need not be stand-alone units formed between the peripheral unit 10 and the document image management server 30. The capture controllers 20, 201 can be integrated into the peripheral unit 10 and/or the document image management server 30.

This invention may also be conveniently implemented using a conventional general purpose digital computer or microprocessor programmed according to the teachings of the present specification, as will be apparent to those skilled in the computer art. Appropriate software coding can readily be prepared by skilled programmers based on the teachings of the present disclosure, as will be apparent to those skilled in the software art. The present invention may also be implemented by the preparation of application specific integrated circuits or by interconnecting an appropriate network of conventional component circuits, as will be readily apparent to those skilled in the art.

The present invention also includes a computer program product which is a storage medium including instructions which can be used to program a computer to perform the processes of the present invention. The storage medium can include, but is not limited to, any type of disc including floppy disks, optical disks, CD-ROMS, magneto-optical disks, ROMs, RAMs, EPROMs, EEPROMs, magnetic or optical cards, or any type of media suitable for storing electronic instructions.

Obviously, numerous additional modifications and variations of the present invention are possible in light of the above teachings. It is therefore to be understood that within the scope of the appended claims, the present invention may be practiced otherwise than as specifically described herein.

What is claimed is:

1. A capture controller configured to capture an image from a peripheral unit and to transfer compressed image data based on the captured image to an image management server, comprising:
   a control processor;
   a first memory configured to store raw image data from the peripheral unit under control of the control processor;
   wherein the control processor is configured to convert the raw image data stored in the first memory into compressed image data;
   a second memory configured to store the compressed image data under control of the control processor;
   wherein the control processor is further configured to control transfer of the compressed image data from the second memory to the image management server; and
   wherein the control processor is further configured to stop any executing of converting the raw image data stored in the first memory into compressed image data and to stop any executing of transferring of the compressed image data from the second memory to the image management server when the first memory stores the raw image data to continue executing of the first memory storing the raw image data.

2. A capture controller according to claim 1, wherein the first memory stores the raw image data in units of respective jobs and the second memory stores the compressed image data in units of respective jobs.

3. A capture controller according to claim 2, wherein the control processor is further configured to complete storing of the compressed image data of a current job to the second memory prior to control transferring of the compressed image data of the current job from the second memory to the image management server.

4. A capture controller according to claim 1, wherein the peripheral unit is a multi-function digital copier.

5. A capture controller according to claim 3, wherein the peripheral unit is a multi-function digital copier.

6. A capture controller according to claim 1, wherein the first memory is a hard disk.

7. A capture controller according to claim 5, wherein the first memory is a hard disk.

8. A capture controller according to claim 5, wherein the control processor is further configured to interrupt a currently executing first job, execute a next job, and then return to continue executing the first job when the next job is completed.

9. A capture controller according to claim 1, wherein the peripheral unit outputs the raw image data on a first communication line and outputs control data on a second communication line, the capture controller further comprising:
   a third memory configured to store the raw image data output from the peripheral unit under control of the control processor and to provide the raw image data to the first memory; and
   wherein the control processor is further configured to receive the control data from the peripheral unit and to set the third memory to a maximum page size when the third memory initially receives the raw image data, and to change the set page size upon receiving the control data.

10. A capture controller according to claim 9, wherein the third memory is a page memory.

11. A capture controller according to claim 10, wherein the third memory has a capacity of three pages.

12. A capture controller according to claim 10, wherein the first memory is a hard disk.

13. A capture controller according to claim 12, wherein the peripheral unit is a multi-function digital copier.

14. A capture controller configured to capture an image from a peripheral unit and to transfer compressed image data based on the captured image to an image management server, comprising:
   control processor means;
   first memory means for storing raw image data from the peripheral unit under control of the control processor means;
   wherein the control processor means converts the raw image data stored in the first memory into compressed image data;
   second memory means for storing the compressed image data under control of the control processor means;
   wherein the control processor means further controls transfer of the compressed image data from the second memory means to the image management server; and
   wherein the control processor means further stops any executing of converting the raw image data stored in the first memory means into compressed image data and stops any executing of transferring of the compressed image data from the second memory means to the image management server when the first memory means stores the raw image data to continue executing of the first memory means storing the raw image data.

15. A capture controller according to claim 14, wherein the first memory means stores the raw image data in units of respective jobs and the second memory means stores the compressed image data in units of respective jobs.

16. A capture controller according to claim 15, wherein the control processor means further completes storing of the compressed image data of a current job to the second memory means prior to controlling transferring of the compressed image data of the current job from the second memory means to the image management server.

17. A capture controller according to claim 14, wherein the peripheral unit is a multi-function digital copier.

18. A capture controller according to claim 16, wherein the peripheral unit is a multi-function digital copier.

19. A capture controller according to claim 14, wherein the first memory means is a hard disk.

20. A capture controller according to claim 18, wherein the first memory means is a hard disk.

21. A capture controller according to claim 18, wherein the control processor means can further interrupt a currently executing first job, execute a next job, and then return to continue executing the first job when the next job is completed.

22. A capture controller according to claim 14, wherein the peripheral unit outputs the raw image data on a first communication line and outputs control data on a second communication line, the capture controller further comprising:

third memory means for storing the raw image data output from the peripheral unit under control of the control processor means and for providing the raw image data to the first memory means; and wherein the control processor means further receives the control data from the peripheral unit and sets the third memory means to a maximum page size when the third memory means initially receives the raw image data, and changes the set page size upon receiving the control data.

23. A capture controller according to claim 22, wherein the third memory means is a page memory.

24. A capture controller according to claim 23, wherein the third memory means has a capacity of three pages.

25. A capture controller according to claim 23, wherein the first memory means is a hard disk.

26. A capture controller according to claim 25, wherein the peripheral unit is a multi-function digital copier.

27. An image capturing process for capturing an image from a peripheral unit and transferring compressed image data based on the captured image to an image management unit, comprising the steps of:

first storing raw image data from the peripheral unit into a first memory;

converting the raw image data into compressed image data;

second storing the compressed image data into a second memory;

transferring the compressed image data from the second memory to the image management server; and stopping any executing converting step, any executing second storing step, and any executing transferring step when the first storing step is being executed to continue executing of the first storing the raw image data.

28. An image capturing process according to claim 27, wherein the first storing step stores the raw image data in units of respective jobs and the second storing step stores the compressed image data in units of respective jobs.

29. An image capturing process according to claim 28, wherein the second storing step is completed for storing compressed image data of a current job prior to the transferring step transferring the compressed image data of the current job from the second memory to the image management server.

30. An image capturing process according to claim 27, wherein the peripheral unit is a multi-function digital copier.

31. An image capturing process according to claim 29, wherein the peripheral unit is a multi-function digital copier.

32. An image capturing process according to claim 27, wherein the first memory is a hard disk.

33. An image capturing process according to claim 31, wherein the first memory is a hard disk.

34. An image capturing process according to claim 31, further comprising a step of allowing interrupting of a currently executing first job, executing a next job, and then returning to continue executing the first job when the next job is completed.

35. An image capturing process according to claim 27, wherein the peripheral unit outputs the raw image data on a first communication line and outputs control data on a second communication line, the image capturing process further comprising the steps of:

prior to the first storing step, prestoring the raw image data output from the peripheral unit in a third memory initially set to a maximum page size under control by a control process;

changing the set page size based on the control data output from the peripheral unit when the control process receives the control data; and transferring the raw image data with the changed page size from the third memory to the first memory.

36. An image capturing process according to claim 35, wherein the third memory is a page memory.

37. An image capturing process according to claim 36, wherein the third memory has a capacity of three pages.

38. An image capturing process according to claim 36, wherein the first memory is a hard disk.

39. An image capturing process according to claim 38, wherein the peripheral unit is a multi-function digital copier.

* * * * *